United States Patent
Gu et al.

(10) Patent No.: US 6,721,444 B1
(45) Date of Patent: Apr. 13, 2004

(54) 3-DIMENSIONAL OBJECT RECOGNITION METHOD AND BIN-PICKING SYSTEM USING THE METHOD

(75) Inventors: Haisong Gu, Suita (JP); Tomoharu Nakahara, Nishinomiya (JP); Hidekazu Araki, Moriguchi (JP); Hiroyuki Fujii, Shijonwate (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 09/581,550

(22) PCT Filed: Mar. 17, 2000

(86) PCT No.: PCT/JP00/01685
§ 371 (c)(1),
(2), (4) Date: Jul. 13, 2000

(87) PCT Pub. No.: WO00/57129
PCT Pub. Date: Sep. 28, 2000

(30) Foreign Application Priority Data

Mar. 19, 1999 (JP) .......................... 11/076538
Sep. 7, 1999 (JP) .......................... 11/253099
Oct. 26, 1999 (JP) .......................... 11/304437

(51) Int. Cl.⁷ .............................. G06K 9/00
(52) U.S. Cl. .................... 382/154; 382/218; 382/291; 345/419
(58) Field of Search ................. 382/103, 151, 382/153–154, 181, 190, 209, 216–218, 285, 291, 294; 345/418, 419, 424; 348/42, 47, 48, 50, 51, 169

(56) References Cited

U.S. PATENT DOCUMENTS 4,414,685 A * 11/1983 Sternberg .................... 382/257
4,573,191 A * 2/1986 Kidode et al. .............. 382/106

(List continued on next page.)

FOREIGN PATENT DOCUMENTS

| JP | 4-130587 | 5/1992 |
| JP | 5-134731 | 6/1993 |
| JP | 6-35517 | 2/1994 |
| JP | 7-299782 | 11/1995 |

(List continued on next page.)

OTHER PUBLICATIONS

Hansen, et al. "Towards Real–Time Trinocular Stereo", IEEE, pp. 129–133, 1988.*

(List continued on next page.)

*Primary Examiner*—Daniel Mariam
(74) *Attorney, Agent, or Firm*—Oblon, Spivak, McClelland, Maier & Neustadt, P.C.

(57) ABSTRACT

A 3-dimensional object recognition method, by use of which three-dimensional position and posture of an object can be accurately recognized at high speed, comprises the steps of (A) taking a pair of first and second images for making a stereo image of the object; (B) detecting a two-dimensional feature of the object on each of the first and second images; (C) evaluating a degree of reliability of the result of the step (B) by comparing with a model data of the object; (D) making a correspondence of the two-dimensional feature between the first and second images according to a stereo-scopic measurement principle; (E) evaluating a degree of reliability of the result of the step (D) by comparing the two-dimensional feature detected on the first image with the corresponding two-dimensional feature detected on the second image; (F) recognizing the three-dimensional position and posture of the object according to information in three dimensions of the two-dimensional feature obtained by the correspondence; and (G) evaluating a degree of reliability of the recognized three-dimensional position and posture. It is preferred to use the 3-dimensional object recognition method to a bin-picking system for picking up an article from a bin, in which a plurality of articles are heaped up in confusion, and carrying the picked-up article to a required position.

22 Claims, 13 Drawing Sheets

U.S. PATENT DOCUMENTS

| | | | | |
|---|---|---|---|---|
| 4,575,304 A | * | 3/1986 | Nakagawa et al. | 414/730 |
| 4,654,872 A | * | 3/1987 | Hisano et al. | 382/154 |
| 5,267,329 A | * | 11/1993 | Ulich et al. | 382/103 |
| 5,692,061 A | | 11/1997 | Sasada et al. | 382/106 |
| 5,845,006 A | * | 12/1998 | Sumi et al. | 382/154 |
| 5,887,083 A | * | 3/1999 | Sumi et al. | 382/199 |
| 5,917,937 A | * | 6/1999 | Szeliski et al. | 382/154 |

FOREIGN PATENT DOCUMENTS

| | | |
|---|---|---|
| JP | 8-136220 | 5/1996 |
| JP | 8-145628 | 6/1996 |
| JP | 9-147121 | 6/1997 |
| JP | 9-277184 | 10/1997 |
| JP | 10-31742 | 2/1998 |
| JP | 10-206135 | 8/1998 |

OTHER PUBLICATIONS

Roman, et al. "Interactive Complexity Control and High–Speed Stereo Matching", IEEE, pp. 171–176, 1988.*

Okamoto, et al. "Robot Vision Using Object Models for Recognition Strategy Generation and Precise Localization", IEEE, pp. 558–563, 1990.*

* cited by examiner

Left image        Right image (A)        (B)

Left image    Right image (A)

(B)

Left image                    Right image (A)                              (B)

(A) (B)

3-DIMENSIONAL OBJECT RECOGNITION METHOD AND BIN-PICKING SYSTEM USING THE METHOD

TECHNICAL FIELD

The present invention relates to a 3-dimensional object recognition method, by use of which an object can be accurately recognized at high speed, and a bin-picking system using the same method.

BACKGROUND ART

In the past, various methods of recognizing 3-dimensional position and posture or the configuration of an object by use of a pair of 2-dimensional images for making a stereo image have been proposed. For example, Japanese Patent Early Publication [KOKAI] No. 10-206135 describes about "DECISION METHOD FOR POSITIONAL POSTURE OF THREE-DIMENSIONAL OBJECT". In this method, an edge image is extracted from a stereo image obtained by observing a free curved-surface body that is a three-dimensional object. The edge image is divided into segments according to its local feature, and then local geometrical features are added to the segments. Next, the local geometrical features of the segments are collated initially with a local geometrical feature model of a free curved-surface body model that is previously created to detect a corresponding candidate. A small plane patch of the free curved-surface body model corresponding to the apparent contour line of the free curved-surface body is selected on the basis of the positional posture and the observation direction of the candidate. The corresponding candidate is adjusted fine by use of the selected small plane patch. The positional posture of the free curved-surface body is detected by a recognition treatment according to the fine adjustment and the initial collation described above.

On the other hand, Japanese Patent Early Publication [KOKAI] No. 8-136220 describes about "METHOD AND DEVICE FOR DETECTING POSITION OF ARTICLE". In this method, feature portions such as line segments and arcs are extracted from an image obtained by picking up an object article with two cameras. By matching these feature portions with feature portions on a two-dimensional viewing-pattern model, the correspondence between the left and right images is made according to the stereoscopic measuring principle. Three-dimensional positions of the feature portions are measured by use of the result of the correspondence, so that a three-dimensional structure model of the object article is established. The three-dimensional position of the object article is computed by matching the feature portions, whose three-dimensional positions are measured, with the feature portions of the three-dimensional structure model.

In addition, Japanese Patent Early Publication [KOKAI] No. 4-130587 describes about "THREE-DIMENSIONAL PICTURE EVALUATION DEVICE". In this device, the position and the posture of an object are estimated according to picture information obtained by picking up the object with three TV cameras and known three-dimensional model data of the article. Then, picture information obtained when picking up the model in the estimated position and posture is predicted to obtain predicted picture information. The picture information picked up by the TV cameras is compared with the predicted picture information, and a degree of the match therebetween is determined to recognize the three-dimensional object.

Since these methods are built on premises that the information detected from the image provided by the image pickup device is correct, there is a problem that the object can not be accurately recognized when using an image with complex information obtained by picking up a scene that a plurality of objects with the same configuration are heaped up in confusion, or an image including noise. Moreover, the methods of Japanese Patent Early Publication [KOKAI] Nos. 10-206135 and 08-136220 need a repetition treatment of determining predicted values of two-dimensional features from the three-dimensional information to perform collation, correcting the estimation of the three-dimensional position and posture according to the result of collation, and predicting the two-dimensional features from the obtained three-dimensional information. Therefore, there is a problem that the treatment time is extended, so that the efficiency of recognition lowers.

DISCLOSURE OF INVENTION

Therefore, a primary object of the present invention is to provide a 3-dimensional object recognition method, by use of which three-dimensional position and posture of an object can be accurately recognized at high speed. That is, this three-dimensional object recognition method comprises:

a step (A) of taking a pair of first and second images for making a stereo image of an object;

a step (B) of detecting a two-dimensional feature of the object in each of the first and second images;

a step (D) of making a correspondence of the two-dimensional feature between the first and second images according to a stereoscopic measurement principle;

a step (F) of recognizing three-dimensional position and posture of the object according to information in three dimensions of the two-dimensional feature obtained by the correspondence; and a step (G) of evaluating a degree of reliability of the recognized three-dimensional position and posture;

wherein the method comprises at least one of a step (C) of evaluating a degree of reliability of a result of the step (B) by comparing with known model data of the object, which is performed between the steps (B) and (D), and a step (E) of evaluating a degree of reliability of a result of the step (D) by comparing the two-dimensional feature detected in the first image with the corresponding two-dimensional feature detected in the second image, which is performed between the steps (D) and (F).

In addition, a further object of the present invention is to provide a 3-fimensional recognition method described below for accurately recognizing three-dimensional position and posture of an object at high speed. That is, the three-dimensional recognition method comprises:

a step (A) of taking a pair of first and second images for making a stereo image of an object, and a third image from a viewpoint different from them;

a step (B) of detecting a two-dimensional feature of the object in each of the first, second and third images;

a step (D) of making a correspondence of the two-dimensional feature each between the first and second images and between the first and third images according to a stereoscopic measurement principle;

a step (F) of recognizing a first candidate of three-dimensional position and posture of the object according to information in three dimensions of the two-dimensional feature obtained from the correspondence between the first and second images, and a second candidate of three-dimensional position and posture of the object according to information in three dimensions of the two-dimensional feature obtained from the correspondence between the first and third images; and a step (G) of evaluating a degree of reliability of each of the first and second candidates;

wherein the recognition method comprises at least one of a step (C) of evaluating a degree of reliability of a result of the step (B) by comparing with model data of the object, which is performed between the steps (B) and (D), a step (E) of evaluating a degree of reliability of a result of the step (D) by comparing the two-dimensional feature detected in the first image with the corresponding two-dimensional features detected in the second and third images, which is performed between the steps (D) and (F), and a step (H) of determining three-dimensional position and posture of the object according to the first and second candidates provided from the step (G).

Another object of the present invention is to provide a bin-picking system using the 3-dimensional object recognition method mentioned above. The bin-picking system of the present invention comprises an image-processing unit for performing the 3-dimensional object recognition method mentioned above, a robot with a flexible robot arm, and a robot controller for controlling the robot according to information provided from the image-processing unit such that the robot arm picks up an object from a bin, in which a plurality of objects are heaped up in confusion, and carries the picked-up object to a required position. Therefore, even when picking up a part from a bin, in which a plurality of parts having the same configuration are heaped up in confusion, it is possible to select a part that is the easiest to pick up from the bin, and pick up the selected part. As a result, it is possible to provide efficient and accurate supply of parts in production line, while preventing the occurrence of pickup miss.

Further features of the present invention and advantages brought thereby will become apparent from the following detailed description of the preferred embodiments of the present invention referring to the attached drawings.

DETAILED DESCRIPTION OF THE PREFERRED EMBODIMENTS

First Embodiment

Figure 1:
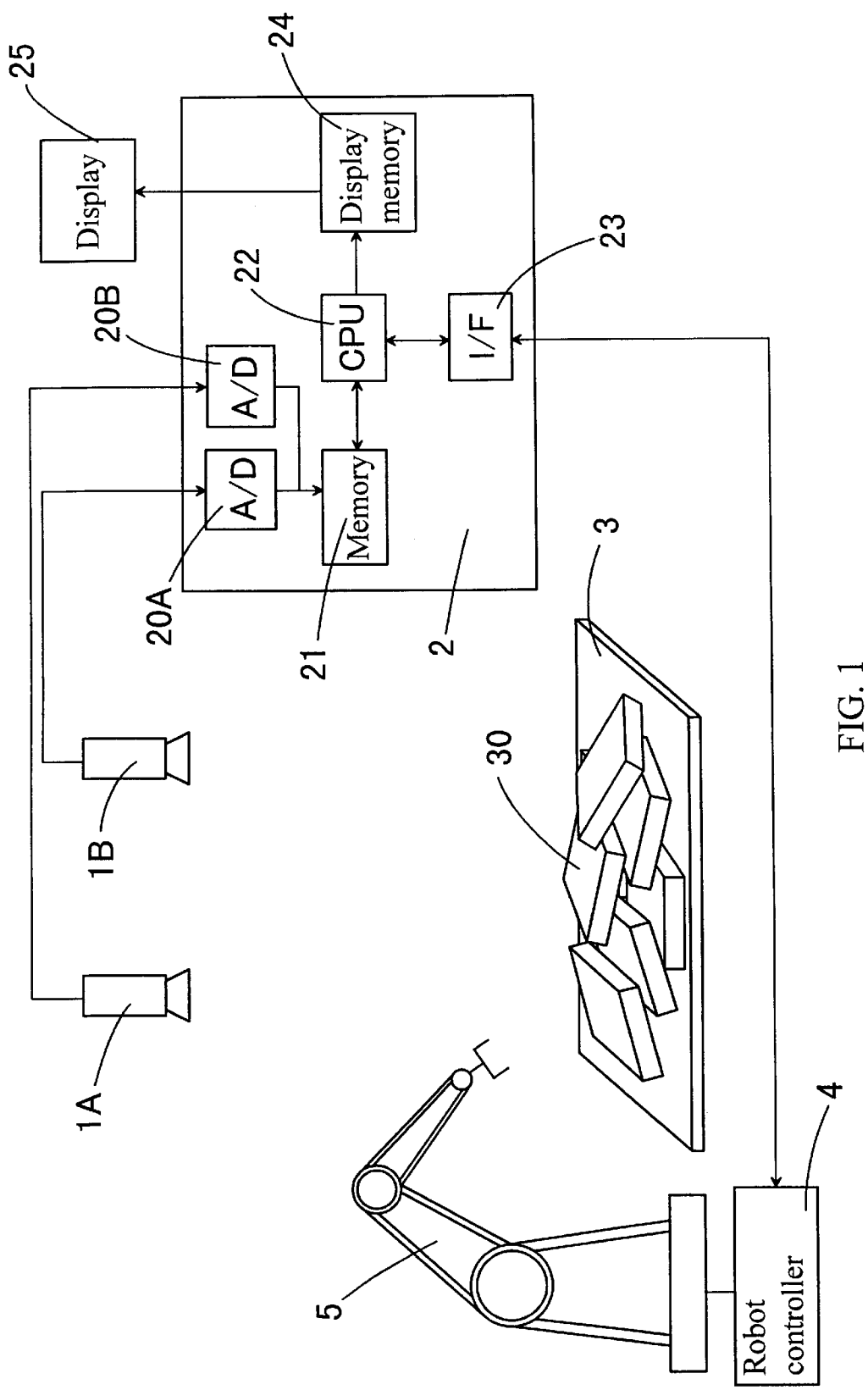
FIG. 1 is a schematic diagram of a bin-picking system using a three-dimensional object recognition method according to a first embodiment of the present invention.

A 3-dimensional object recognition method of the present invention can be preferably used for a bin-picking system for feeding parts. For example, as shown in FIG. 1, the bin-picking system comprises a pair of TV cameras (1A, 1B), image processing unit 2 for performing the 3-dimensional object recognition method of the present invention with use of image information provided from these TV cameras, robot 5 with a flexible robot arm capable of catching a part 30, and a robot controller 4 for controlling the robot 5 according to outputs provided from the image processing unit 2 such that the robot arm picks up the part 30 from a bin, in which a plurality of parts 30 are heaped up in confusion on a pickup table 3, and carries the picked-up part to a required position.

In the image-processing unit 2, the taken video signals are converted into digital signals by A/D converters (20A, 20B), and provisionally stored in a memory 21. Subsequently, the 3-dimensional object recognition method of the present invention is performed in a CPU 22 to send position and posture data in three dimensions of the part to the robot controller 4 through a communication I/F 23. Recognition results are stored in a display memory 24, and can be monitored on a display 25.

Figure 2:
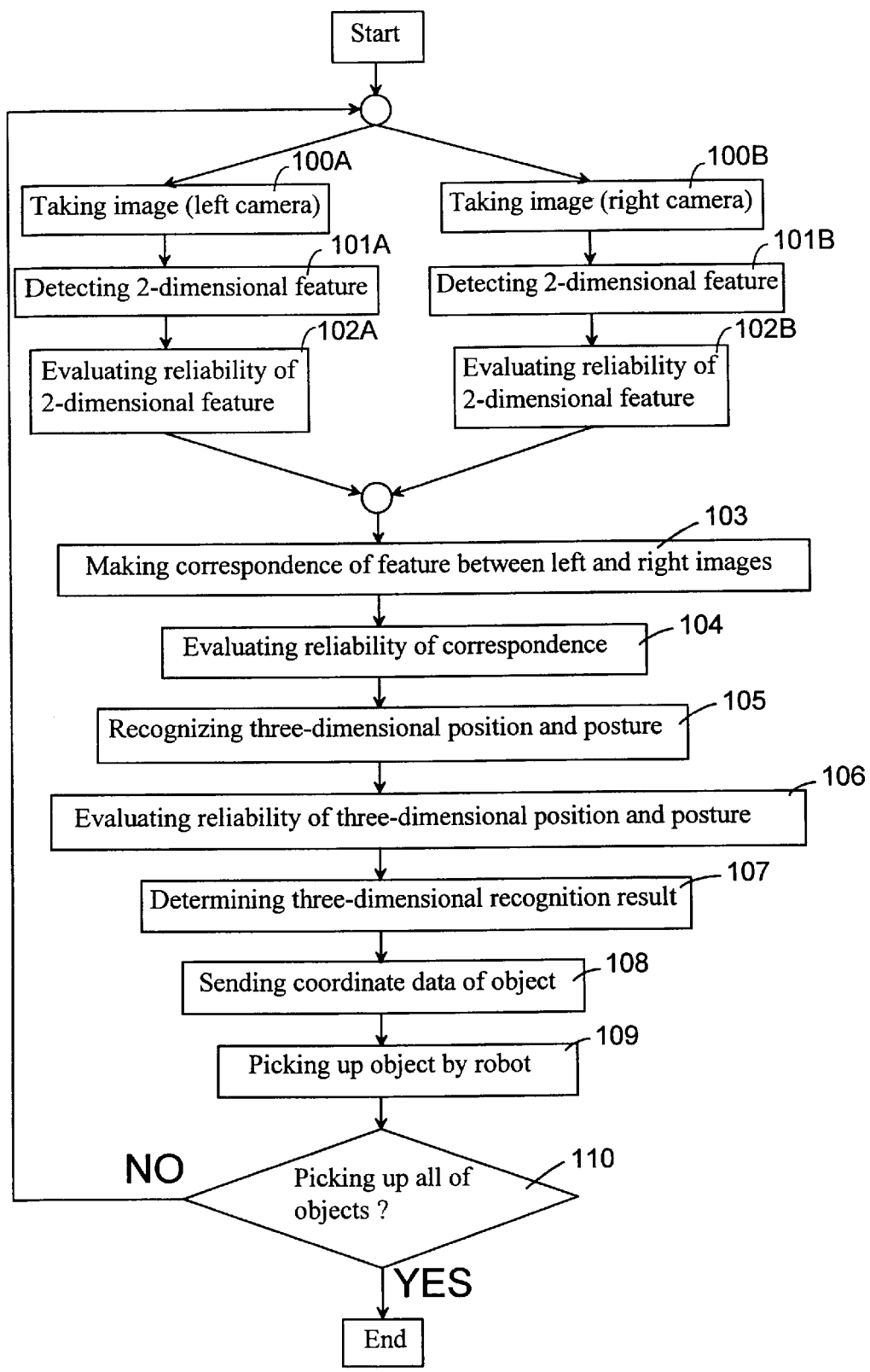
FIG. 2 is a flowchart showing the three-dimensional object recognition method according to the first embodiment of the present invention.

The 3-dimensional object recognition method of the present invention is explained below in detail referring to a flowchart of FIG. 2.

<STEPS 100A, 100B>

Figure 3:
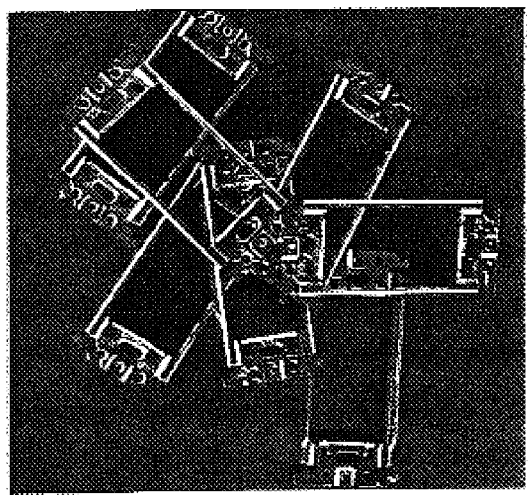
In FIG. 3, (A) and (B) are left and right images of articles picked up by TV cameras, respectively.
Figure 3:
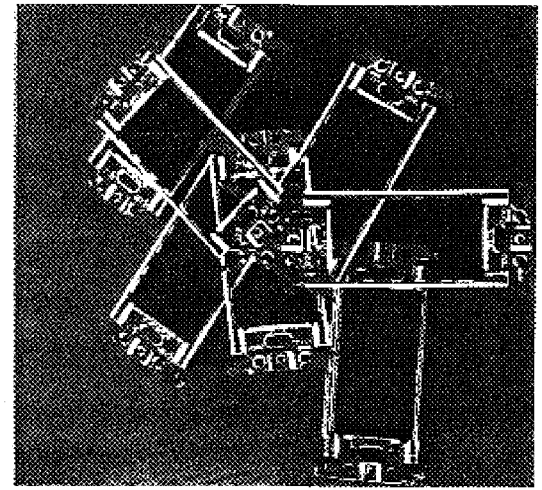
Figure 4:
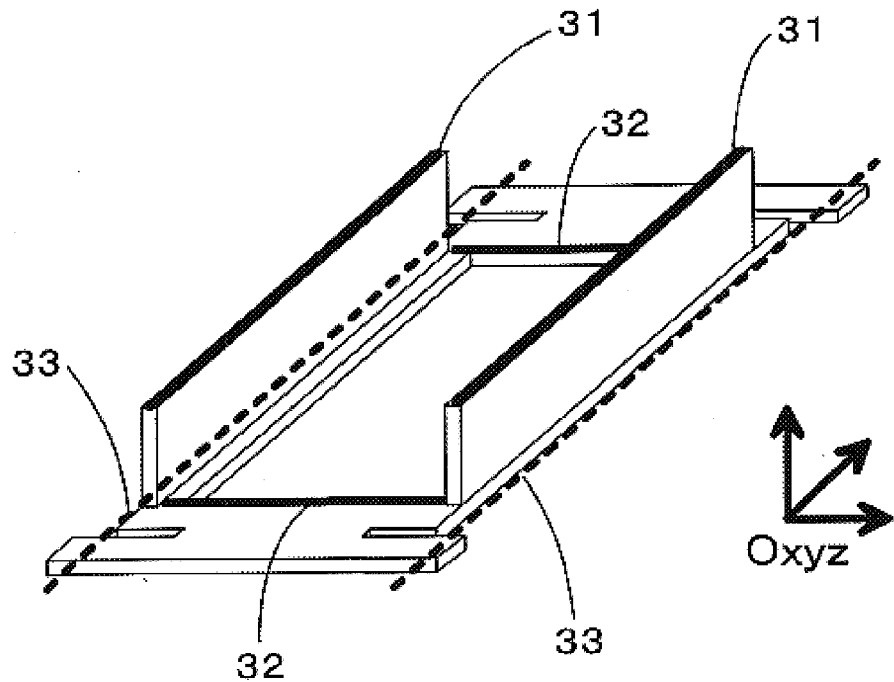
FIG. 4 is a perspective view of the article to be picked up in the bin-picking system of the present embodiment.

In the steps 100A and 100B, images of the parts 30 that are heaped up in confusion on the pickup table 3 are taken by the TV cameras 1A and 1B. As an example, the taken pair of left and right images are shown in FIGS. 3(A) and 3(B). Each of the parts 30 used in this embodiment is a frame part having a rectangular shape, as shown in FIG. 4, and made of a lustrous metal material. The frame part has long-side pair 31 on the rear surface, and long-side pair 33 and short-side pair 32 on the front surface.

<STEPS 101A, 101B>

Figure 5:
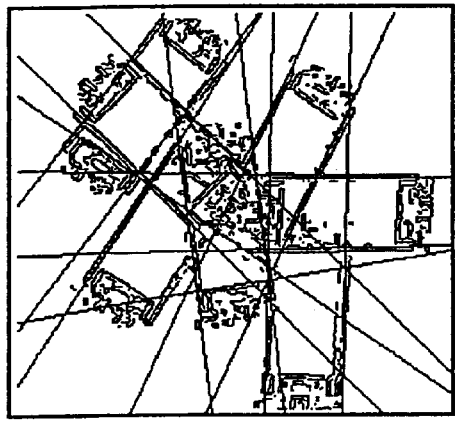
In FIG. 5, (A) and (B) are left and right images, in each of which a two-dimensional feature (long-side pair) of the articles is detected.
Figure 5:
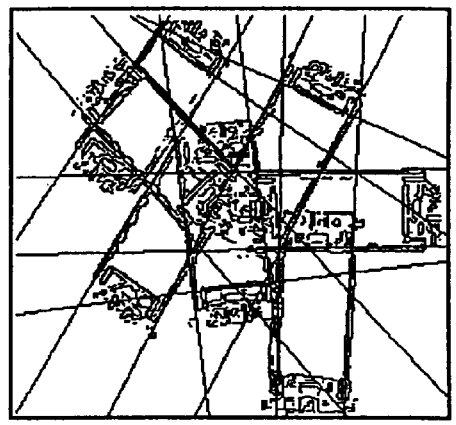

Next, in the steps 101A and 101B, two-dimensional features of the parts are detected from the left and right images. After the left and right images taken by the TV cameras 1A and 1B are converted into digital signals by the A/D converters (20A, 20B), an edge image is prepared according to a pattern of light and dark with regard to each of the left and right images. In this embodiment, since the frame part is made of the lustrous metal material, the edge image can be prepared by the formation of highlight by lighting. Then, in each of the left and right images, the long-side pairs of the frame parts are detected as a typical feature of the frame part by means of the Hough transform. FIGS. 5(A) and 5(B) are results of detecting the long-side pairs on the left and right images of FIGS. 3(A) and 3(B), respectively. The Hough transform is a known method of detecting straight lines based on "Integration of evidence information by vote" and "Principle of majority decision". Therefore, explanations about the principle are omitted.

Figure 6:
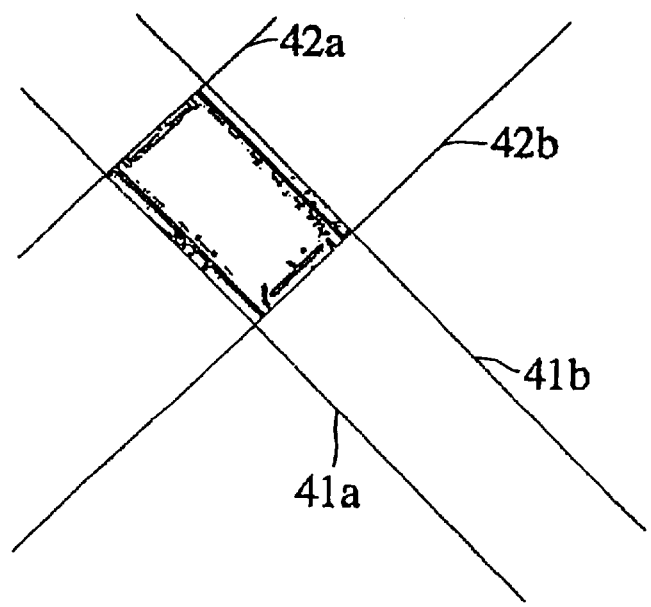
FIG. 6 is a diagram showing a result of detecting long-side and short-side pairs of a single article.
Figure 7:
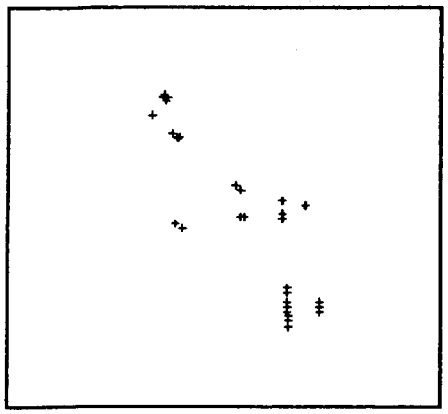
In FIG. 7, (A) and (B) are diagrams showing distributions of the centers of rectangles recognized on the left and right images, respectively.
Figure 7:
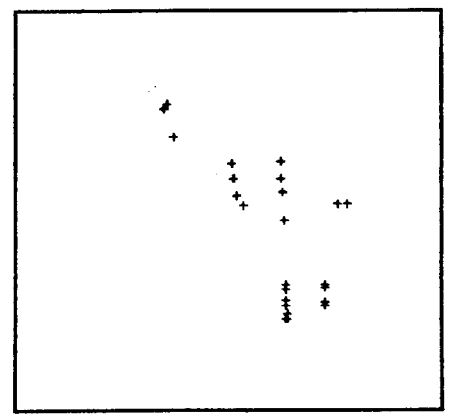

Next, the short-side pair is detected as a supplemental feature of the part in the area between the long-side pair by means of the Hough transform. FIG. 6 shows a result of detecting a long-side pair (41a, 41b) and a short-side pair (42a, 42b) of a single part 30. Thus, it is preferred to extracting two-dimensional features of an object by firstly detecting the typical geometrical feature of the object and detecting a geometrical feature other than the typical geometrical feature as a supplemental feature. Rectangles each comprised of a combination of the detected long-side pair and the short-side pair are provided as recognition candidates. The center point and four corner points of the respective rectangle are determined. The distributions of the center points of the rectangles recognized in the left and right images are shown in FIGS. 7(A) and 7(B). When a plurality of parts having the same shape overlap in view, as mentioned in this embodiment, there are a lot of misrecognition in the recognition candidates of the two-dimensional features. Therefore, in order to obtain accurate recognition results of the parts, it is necessary to evaluate a degree of reliability of each of the recognition candidates, as described later.

Figure 8:
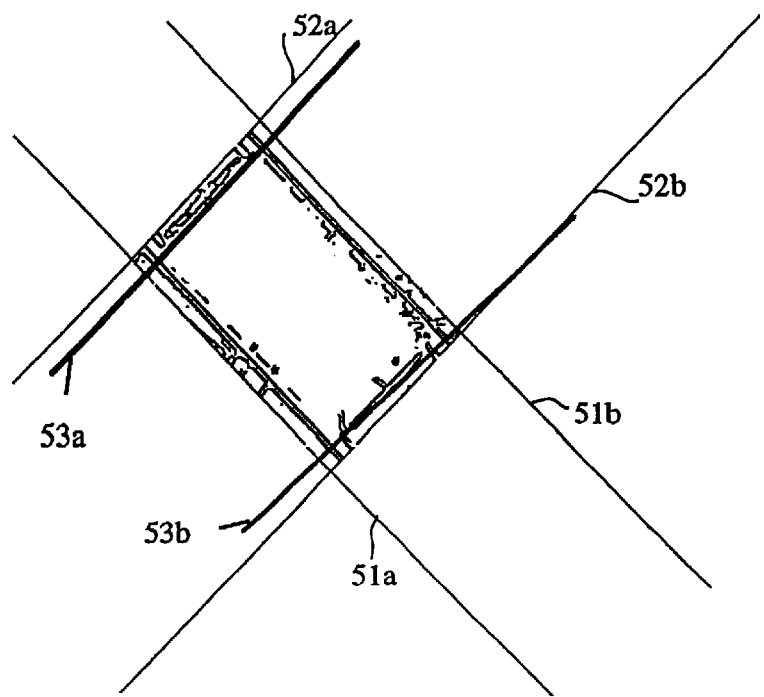
FIG. 8 is a diagram showing a result of detecting a long-side pair and short-side pairs of a single article.

As another embodiment of the steps 101A and 101B, it is preferred to detect two-dimensional features of the parts according to the following manner. As shown in FIG. 8, a long-side pair (51a, 51b) is detected as the typical feature of the part by means of the Hough transform. Then, a first short-side pair (52a, 52b) and a second short-side pair (53a, 53b) are detected in a region surrounded by the detected long-side pair (51a, 51b) by means of the Hough transform. A rectangle obtained by a combination of the long-side pair (51a, 51b) and the first short-side pair (52a, 52b) is provided as a first recognition candidate, and a rectangle obtained by a combination of the long-side pair (51a, 51b) and the second short-side pair (53a, 53b) is provided as a second recognition candidate. In FIG. 8, a plurality of straight-line pairs are detected as to the short side. Similarly, a plurality of straight-line pairs may be detected as to the long side. Thus, when detecting the plural recognition candidates, it is possible to reduce the influence of noise and distortion of input image.

The two-dimensional features to be detected are not limited to the above long-side pair and the short-side pair. According to the shape of an object to be recognized, for example, it is possible to use two-dimensional features such as circle, arc, straight line, straight-line pair, length of straight-line pair, direction of straight-line pair, and distance between parallel straight lines. In addition, when using black and white TV cameras to take the left and right images, it is possible to obtain the typical and supplemental two-dimensional features of the object by differentiating each of the obtained gray images to determine edge and its gradient, and detecting a straight line and a straight-line pair or a circle and an arc by means of the Hough transform. Moreover, when using color TV cameras, it is possible to use image regions corresponding to a typical color of the object as the typical two-dimensional feature or the supplemental two-dimensional feature.

Figure 9:
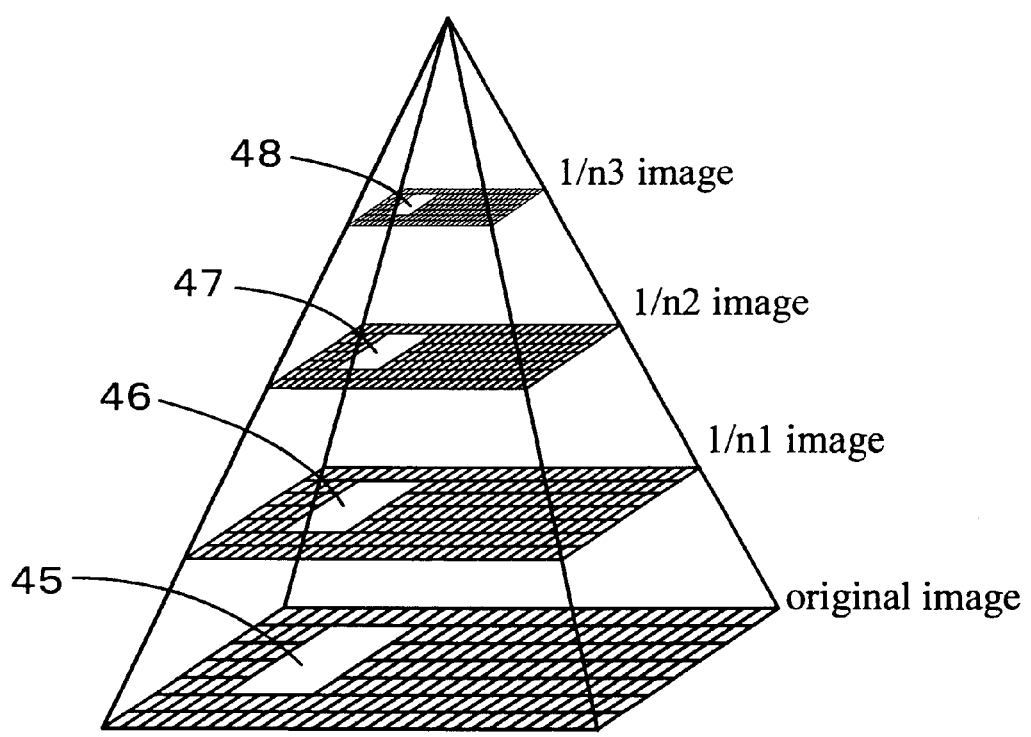
FIG. 9 is a conceptual drawing for a method of selecting a two-dimensional feature by use of a pyramid image.

It is preferred that the two-dimensional features that are local features of a 3-dimensional object are stable toward the image-taking direction and a change in lighting. For example, as shown in FIG. 9, it is possible to adequately select the two-dimensional features by use of pyramid images. A rough feature, e.g., the position of long-side pair, is firstly detected from an image (original image) with a coarse resolution by means of the Hough transform. Then, the other feature of the object, e.g., short-side pair, is detected from an image with an adequate resolution according to a relation among the measurement accuracy, size of the feature to be detected, and the resolution of image. Thereby, the rectangular shape of the object can be stably recognized. In the figure, the numeral 45 designates an image of two-dimensional features of an object on an original image. The numerals 46, 47 and 48 designate images of the two-dimensional features of the object on 1/n1, 1/n2 and 1/n3 images, respectively.

<STEPS 102A, 102B>

Next, in the steps 102A and 102B, a degree of reliability of information as to the two-dimensional features provided from the steps 101A and 101B is evaluated in comparison with a known model data of the part. The reliability evaluation is performed by use of information such as a geometrical size selected according to the shape of an object to be recognized. Concretely, for example, the degree of reliability can be evaluated by use of a measurement uncertainty represented by the following equation, $$f1=|Lm-Lr| \quad (1)$$

wherein "f1" is a reliability evaluation value of a two-dimensional feature, "Lr" is a length (measured value) of a straight line of an object, and "Lm" is an actual length of the corresponding straight line of the object. When the reliability evaluation value "f1" is larger than a required threshold value, the detected two-dimensional feature is deleted as misrecognition.

Alternatively, the degree of reliability may be evaluated by use of a measurement uncertainty represented by the following equation, $$fv=|\Theta m-\Theta r| \quad (2)$$

wherein "fv" is a reliability evaluation value of a two-dimensional feature, "$\Theta r$" is an angle (measured value) defined by first and second parallel straight-line pairs, which form a rectangle of an object, and "$\Theta m$" is an actual angle defined by the first and second parallel straight-line pairs of the object. When the reliability evaluation value "fv" is larger than a required threshold value, the detected two-dimensional feature is deleted as misrecognition.

In addition, the degree of reliability may be evaluated by use of a measurement uncertainty represented by the following equation, $$fd=|Dm-Dr| \quad (3)$$

wherein "fd" is a reliability evaluation value of a two-dimensional feature, "Dr" is a distance (measured value) between parallel straight lines of an object detected from an image, and "Dm" is an actual distance between the corresponding parallel straight lines of the object. When the reliability evaluation value "fd" is larger than a required threshold value, the detected two-dimensional feature is deleted as misrecognition.

Moreover, a degree of overall reliability may be evaluated by the following equation obtained by use of the equations (2) and (3), $$f\sigma 32 \ |\Theta m-\Theta r|+|Dm-Dr| \quad (4)$$

wherein "fσ" is an evaluation value of overall reliability of a two-dimensional feature.

Thus, it is preferred to compare the two-dimensional feature detected in each of the left and right images with that of the actual object, and delete the detected two-dimensional feature as misrecognition when a-difference therebetween exceeds a required threshold value. In this case, since the misrecognition included in the information provided from the steps (101A, 101B) is deleted immediately before the step 103 of making a correspondence of the two-dimensional feature between the left and right images according to a stereoscopic measurement principle, it is possible to avoid performing the treatment of making the correspondence for the misrecognition information, and thereby totally improve the treatment efficiency of the 3-dimensional object recognition method. In the reliability evaluation described above, the degree of reliability may be evaluated by setting a plurality of reliability evaluation sections having different weight coefficients, and using the weight coefficient of the reliability evaluation section including the determined evaluation value.

<STEP 103>

Figure 10:
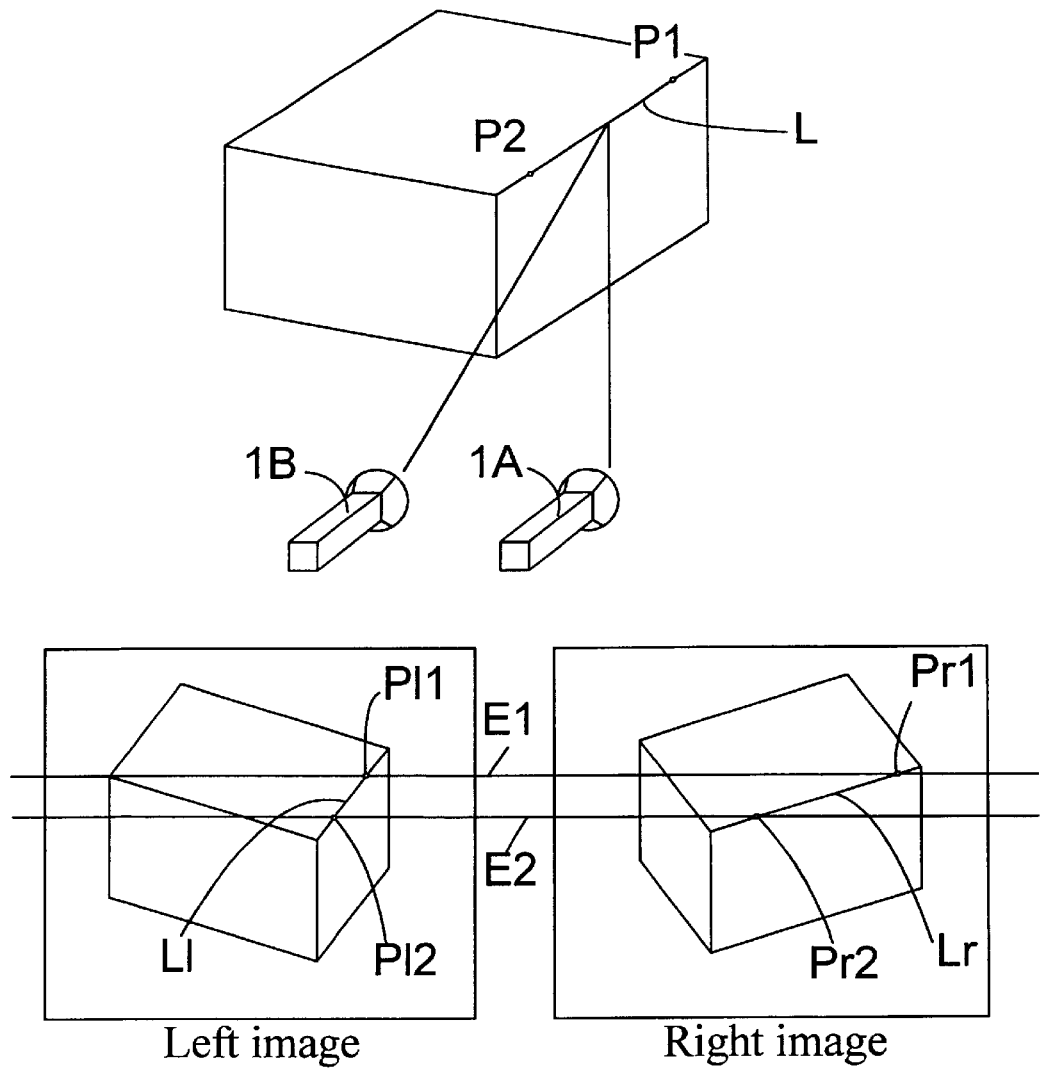
FIG. 10 is an explanatory diagram for a line-segment-based stereoscopic measurement principle.

In the step 103, the correspondence between the two-dimensional features on the left and right images of the object, which are provided from the steps of 102A and 102B, is made according to the stereoscopic measurement principle. In this embodiment, since the part 30 has line features, a line-segment-based stereoscopic measurement principle is used to make the correspondence. FIG. 10 is an explanatory diagram of the stereoscopic measurement principle. As to line-segment features L1, Lr of left and right images shown in FIG. 10, two epipolar lines E1, E2 passing these line segments are set. The epipolar line is a line obtained by intersection of a plane comprised of lens centers of the left and right cameras and a point to be measured with an image pickup plane of each camera. Since parallax can be determined from points PI1, Pr1 of intersection of the left and right line-segment features L1, Lr with the epipolar line E1, a distance between the camera lens and the point P1 on a side L of the object, i.e., a height coordinate in three dimensions of the point P1 on the image, is obtained by the following equation.

$$Z=(F \times B)/D \quad (5)$$

wherein "F" is a focal distance, "B" is a distance between cameras, and "D" is parallax. Thus, the position coordinates in three dimensions of the point P1 on the side L of the object can be determined. Similarly, since parallax can be determined from points P12, Pr2 of intersection of the left and right line-segment features L1, Lr with the epipolar line E2, a height coordinate in three dimensions of the point P2 on the side L of the image is obtained by the above equation. Thus, the position coordinates in three dimensions of the point P2 on the side L of the object can be determined. Position and posture of the line L in three dimensions can be determined from the position coordinates in three dimensions of the points P1 and P2. Thus, the step 103 is for the purpose of determining the position and posture in three dimensions of a two-dimensional feature by making the correspondence between the two-dimensional feature (straight line, etc) of the object on the left image and the corresponding two-dimensional feature on the right image.

To make the correspondence of the two-dimensional feature between the left and right images of the object, for example, there are (a) a method using parallelism of a center axis of a straight-line pair and a straight line between left and right images, (b) method using differences in length of a straight-line pair and a straight line between the left and right images, (c) method using a difference in general shape of an object between the left and right images, and (d) a method using differences in direction of a center axis of a straight-line pair and a straight line between the left and right images. As the method (b), it is possible to adopt (b1) a method of determining the number of edge points contributing to a straight line when performing the straight-line detection by the Hough transform as a straight-line length, or (b2) a method of determining a distance between both ends of a straight line obtained by edge tracking as the straight-line length. In addition, as the method (d), it is possible to adopt (d1) a method of determining a direction defined by start and end points of a straight line obtained by edge tracking as a straight-line direction, (d2) method of determining a parameter β representing a straight line when performing the straight-line detection by the Hough transform as the straight-line direction, or (d3) a method of determining a mean value of gradient directions of edges contributing to a straight line when performing the straight-line detection by the Hough transform as the straight-line direction.

<STEP 104>

In the step 104, a degree of reliability of the correspondence of the two-dimensional feature provided from the step 103 is evaluated. To evaluate the degree of reliability of the correspondence, it is possible to use local features of the object, for example, straight-line length, angle defined by first and second parallel straight-line pairs which form a rectangle of an object, and/or a distance between parallel straight lines. When using the straight-line length, the degree of reliability of the correspondence can be evaluated by the following equation, $$F1=|L1-Lr| \quad (6)$$

wherein "F1" is a reliability evaluation value of a correspondence made between the left and right images, "Lr" is a length of a straight line detected on the right image, and "L1" is a length of the corresponding straight line detected on the left image. When the reliability evaluation value "F1" is larger than a required threshold value, the provided correspondence is deleted as miscorrespondence.

In addition, when using the angle defined by two parallel straight-line pairs, the degree of reliability of the correspondence can be evaluated by the following equation, $$F\theta=|\Theta 1-\Theta r| \quad (7)$$

wherein "Fθ" is a reliability evaluation value of a correspondence made between the left and right images, "Θr" is an angle defined by two parallel straight-line pairs detected on the right image, and "Θ" is an angle defined by the corresponding two parallel straight-line pairs detected on the left image. When the reliability evaluation value "Fθ" is larger than a required threshold value, the provided correspondence is deleted as miscorrespondence.

Moreover, when using the distance between parallel straight lines, the degree of reliability of the correspondence can be evaluated by the following equation, $$Fd=|D1-Dr| \qquad (8)$$

wherein "Fd" is a reliability evaluation value of a correspondence made between the left and right images, "Dr" is a distance between parallel straight lines detected on the right image, and "D1" is a distance between the corresponding parallel straight lines detected on the left image. When the reliability evaluation value "Fd" is larger than a required threshold value, the provided correspondence is deleted as miscorrespondence.

Thus, it is preferred to compare a two-dimensional feature detected on the left image with the corresponding two-dimensional feature detected on the right image, and delete the detected two-dimensional feature as miscorrespondence when a difference therebetween exceeds a required threshold value. In this case, since the miscorrespondence included in the information provided from the step 103 is deleted immediately before the next step 105 of recognizing position and posture in three dimensions of the part, it is possible to avoid performing the treatment of recognizing the position and posture in three dimensions of the part according to the miscorrespondence information, and thereby totally improve the treatment efficiency of the 3-dimensional object recognition method. In the reliability evaluation described above, the degree of reliability may be evaluated by setting a plurality of reliability evaluation sections having different weight coefficients, and using the weight coefficient of the reliability evaluation section including the determined evaluation value.

In the present embodiment, the degree of reliability of the correspondence is evaluated by use of the length and direction of the long-side and short-side pairs to delete miscorrespondence. To obtain accurate recognition results, as shown in this embodiment, it is preferred to perform both of the steps (102A, 102B) and the step 104. However, when the degree of reliability is evaluated in the steps (102A, 102B), the reliability evaluation of the step 104 may be omitted. In addition, when the degree of reliability is evaluated in the step 104, the steps (102A, 102B) may be omitted.

<STEP 105>

In the step 105, the position and posture in three dimensions of the object are recognized according to the information in three dimensions of the two-dimensional features of the object provided from the step 104. For example, to recognize the position and posture in three dimensions of the object, it is possible to adopt (A) a method of measuring a center position of a triangle composed of randomly chosen three points on the object as the position of the object and a direction of normal to the triangle plane as the posture of the object, (B) method of measuring an average of directions normal to planes in three dimensions determined from four points or more on the object as the posture of the object and a position in three dimensions that is an average of a combination of positions of four points or more on the object as the position of the object, or (C) a method of measuring an average of directions normal to planes obtained by two sets of parallel lines having different directions on the object as the posture of the object and an average position of four points of intersection of the two sets of parallel lines as the position of the object. In addition, as the method of determining a direction normal to a plane, it is possible to use a method of determining the direction normal to the plane from three-dimensional coordinates of randomly chosen three points by the method of least squares, or a method of determining the direction normal to the plane from a plane equation obtained by use of three-dimensional coordinates of randomly chosen four points according to the Matrin Newell method.

A concrete example of the step 105 is explained below. First, typical position and posture of an object are defined. Concretely, a direction normal to a plane comprised of the short-side pair 32 of the part shown in FIG. 3 is defined as the posture of the part, and a center of a rectangle comprised of the short-side pair 32 and a straight-line pair obtained by projecting the long-side pair 31 on the plane of the short-side pair 32 is defined as the typical position of the object. Then, information in three dimensions of elements of the object required for obtaining the typical position and posture is determined. Concretely, with respect to the part shown in FIG. 3, the information in three dimensions of the short-side pair 32, the long-side pair 31, the plane of the short-side pair and the straight-line pair obtained by projecting the long-side pair 31 on the plane of the short-side pair is determined. Next, three-dimensional position coordinates of the typical point of the object is determined from the information in three dimensions of the elements to obtain the position of the object. Concretely, four points of intersection Pi (Xi, Yi, Zi)(i=1~4) of a rectangle composed of the short-side pair 32 and the straight-line pair obtained by projecting the long-side pair 31 on the plane of the short-side pair are determined. By substituting these coordinates into the following equations, the 3-dimensional position coordinates (Xc, Yc, Zc) of the typical point of the object are obtained.

$$Xc=(X1+X2+X3+X4)/4 \qquad (9)$$

$$Yc=(Y1+Y2+Y3+Y4)/4 \qquad (10)$$

$$Zc=(Z1+Z2+Z3+Z4)/4 \qquad (11)$$

In addition, the posture of the object is determined from the information in three dimensions of the elements. That is, parameters of a direction (a, b, 1) normal to the plane aX+bY+Z+d=0 comprised of the short-side pair are determined by the Matrin Newell method or the method of least squares according to the following equations (12) to thereby obtain the posture of the object.

$$\begin{pmatrix} a \\ b \\ d \end{pmatrix} = \begin{bmatrix} \sum_1^4 X_i^2 & \sum_1^4 X_i Y_i & \sum_1^4 X_i \\ \sum_1^4 X_i Y_i & \sum_1^4 Y_i^2 & \sum_1^4 Y_i \\ \sum_1^4 X_i & \sum_1^4 Y_i & 4 \end{bmatrix}^{-1} \begin{bmatrix} -\sum_1^4 X_i Z_i \\ -\sum_1^4 Y_i Z_i \\ -\sum_1^4 Z_i \end{bmatrix} \qquad (12)$$

$$\begin{bmatrix} a \\ b \\ 1 \end{bmatrix} = \begin{bmatrix} \sum_{i,j=1 \, i \neq j}^{4} (Y_i - Y_j)(Z_i + Z_j) \\ \sum_{i,j=1 \, i \neq j}^{4} (X_i - X_j)(Y_i + Y_j) \\ \sum_{i,j=1 \, i \neq j}^{4} (Z_i - Z_j)(X_i + X_j) \\ \sum_{i,j=1 \, i \neq j}^{4} (X_i - X_j)(Y_i + Y_j) \\ 1 \end{bmatrix}$$

Alternatively, an average of three-dimensional coordinates of plural typical points of the object may be determined as the position of the object, and an average of directions normal to plural typical planes of the object may be determined as the posture of the object.

In the step 105, it is preferred to recognize the front and back of the object. Concretely, required elements of the object, for example, planes comprised of the long-side pair 31 and the short-side pair 32 of the part 30 shown in FIG. 3, are determined. Next, an orientation in three-dimensions of the object is recognized from the relative positional relation between the elements in three dimensions. For example, the posture in three dimensions of the object can be recognized by identifying the front and back of the part 30 according to the relative positional relation in the universal coordinate system Oxyz between the plane of the long-side pair 31 and the plane of the short-side pair 32 of the part 30 shown in FIG. 3. In this example, when the plane of the long-side pair 31 is located at a higher position than the plane of the short-side pair 32, it is recognized as the back. Thus, it is possible to further improve the accuracy of three-dimensional object recognition by identifying the front and back of the object according to the information in three-dimensions of the elements of the object.

Figure 11:
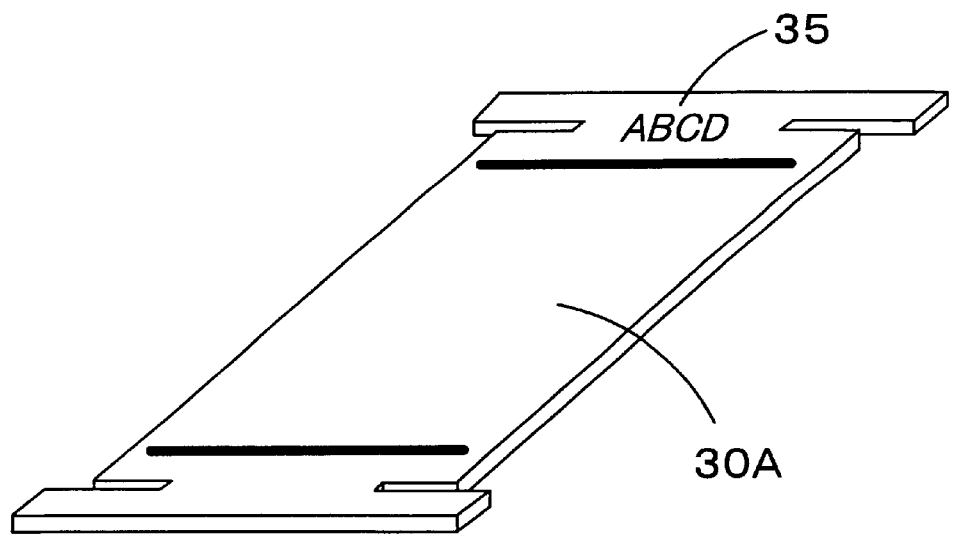
FIG. 11 is a perspective view of an article with a pattern for object recognition.
Figure 12:
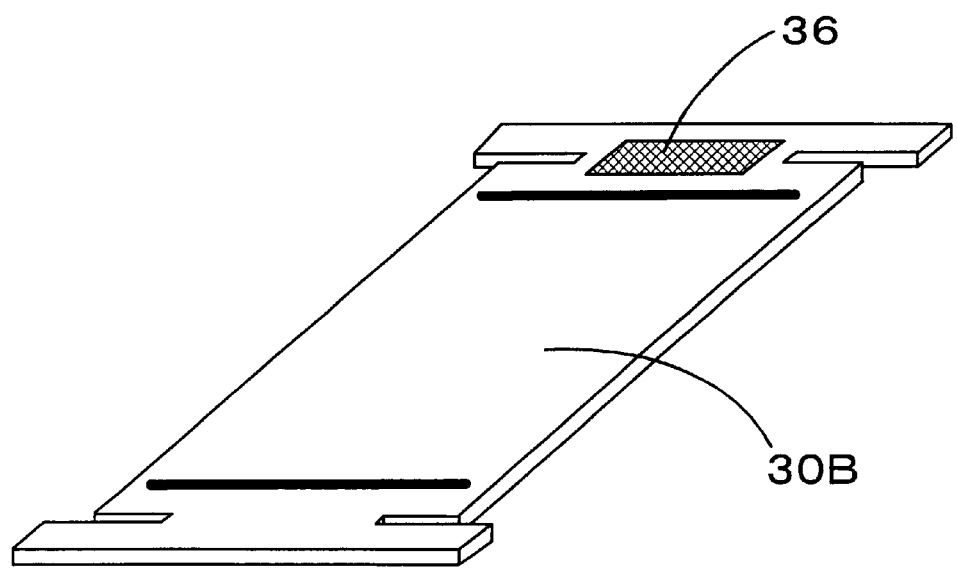
FIG. 12 is a perspective view of an article with a coloring region for object recognition.

In addition, it is preferred to recognize the posture in three dimensions of the object according to a pattern or a color provided on a required region of the object. For example, when identifying the front and back of the object according to a required pattern delineated on the part, a required two-dimensional region of the object is detected on the left and right images to identify the presence or the absence of the pattern such as letters in the region. In case of FIG. 11, since letters 35 "ABCD" are delineated only on the back of a part 30A, it is possible to recognize the front and back of the part 30A by identifying the presence or the absence of the letters. In addition, when identifying the front and back of the object according to a required color region provided on the part, the front and back of a part 30B shown in FIG. 12 can be recognized by detecting a color region 36 provided on the part 30B with use of color TV cameras.

<STEP 106>

In the step 106, a degree of measurement reliability of the recognition results of the position and posture in three dimensions of the object provided from the step 105 is evaluated. That is, the information in three dimensions obtained by measuring the object is compared with a known three-dimensional feature (i.e., model data) of the object to give a rank of reliability to the recognized position and posture in three dimensions according to a difference therebetween. As the known three-dimensional feature of the object to be compared with the measured value, for example, it is possible to use a distance between straight lines in three dimensions of an object, distance between planes in three dimensions of the object, angle defined between directions normal to planes in three dimensions, variations in distance between planes in three dimensions of the object measured at plural positions, variations in position of each of points on a measured straight line in three dimensions and variations in position of each of points on a measured plane in three dimensions.

In addition, it is preferred to evaluate the degree of measurement reliability by use of a reliability evaluation equation including at least two evaluation factors as to geometrical features of the object. In this case, each of the evaluation factors has a weight determined according to its importance. For example, in case of the part shown in FIG. 3, it is preferred to evaluate the degree of reliability of the recognition results of the position and posture in three dimensions of the object with use of the following equations (13) and (14). That is, a degree of overall reliability in two dimensions is evaluated by the following equation with use of line-segment elements of the rectangle, for which the correspondence was made in the step 103, to thereby reconstruct in three dimensions only stereo pairs satisfying a constant degree of reliability on a line-segment basis.

$U_{2d}$=w1(a degree of parallelism in two dimensions of short sides)+w2(a similarity of a distance in two dimensions between short sides)+w3(a similarity between a plane comprised of short sides and a plane comprised of long sides)+w4(a degree of parallelism in two dimensions of long sides)+w5(a similarity of a distance in two dimensions between long sides)+w6(a distance between a plane comprised of short sides and a plane comprised of long sides) (13)

wherein "$U_{2d}$" is an evaluation value of overall reliability in two dimensions, and Wi (i=1~6) is a weight coefficient. Each of the weight coefficients for the evaluation items is determined according to the importance of the evaluation item and a stability of the measured value. For example, since the measured value for distance can be detected with relatively good accuracy, it is preferred to set the weight coefficients w2, w5 and w6 for distance greater than the other weight coefficients. The degree of reliability may be evaluated by setting a plurality of reliability evaluation sections having different weight coefficients, and using the weight coefficient of the evaluation section including the determined evaluation value "$U_{2d}$".

Next, a similarity of the measured value with the model data is checked with respect to each of sides, planes and between planes in three dimensions of the reconstructed object, and a degree of overall reliability in three dimensions is determined by the following equation.

$U_{3d}$=w1(a degree of parallelism of short sides)+w2(a similarity of a distance between short sides)+w3(a flatness of a plane comprised of short sides)+w4(a degree of parallelism of long sides)+w5(a similarity of a distance between long sides)+w6(a flatness of a plane comprised of long sides)+w7(a similarity of a distance between a plane comprised of short sides and a plane comprised of long sides)+w8(a degree of parallelism between a plane comprised of short sides and a plane comprised of long sides)+w9(a similarity between a direction normal to a plane comprised of short sides and a direction normal to a plane comprised of long sides)+w10(a similarity between a short-side axis and a long-side axis) (14)

wherein "$U_{3d}$" is an evaluation value of overall reliability in three dimensions, and Wi (i=1~10) is a weight coefficient. Each of the weight coefficients for the evaluation items is determined according to the importance of the evaluation item and a stability of the measured value.

<STEP 107>

Figure 13:
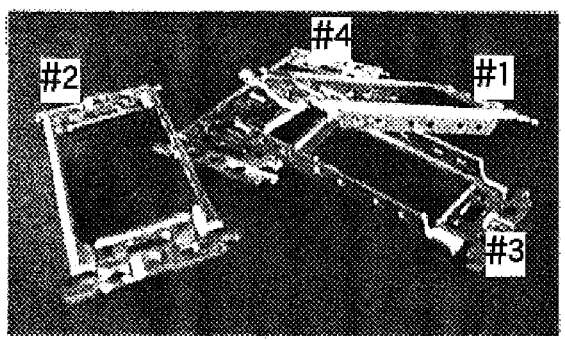
In FIG. 13, (A) is a picture obtained by taking heaped-up articles from a slanting direction, and (B) is an image obtained by taking the heaped-up articles with a camera of the present system.
Figure 13:
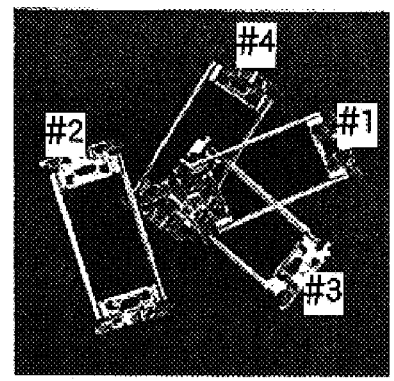

In the step 107, the part to be picked up by the robot arm is determined according to the recognition results of the position and posture in three dimensions of the part provided from the step 106. In the present embodiment, criteria for evaluation that "the part exists at a high position", and "the degree of reliability of the obtained recognition results of the position and posture in three dimensions is high" are used, and the part having the highest level of satisfaction as to these criteria for evaluation is determined as one that is the easiest to pick up. An example of final results is shown in Table 1 and FIGS. 13(A) and 13(B). Table 1 shows a height (Z) of the center point of the part from the pickup table and the degree of reliability (C), with respect to each of the parts designated by numerals #1 to #4 in FIGS. 13(A) and 13(B).

TABLE 1

| No | Height (Z) of the center point of part | Degree of reliability (C) |
|---|---|---|
| #1 | 22.5 | 5155 |
| #2 | 13.8 | 1052 |
| #3 | 13.0 | 1079 |
| #4 | 9.4 | 4079 |

As the numerical value is smaller, the degree of reliability increases. Although the center point of the part #1 exists at the highest position, the degree of reliability is low. On the other hand, the part #2 has the second height of the center point and the highest degree of reliability. Therefore, in this example, the part #2 is selected as the part that is the easiest to pick up. The degree of reliability of the part #1 is low because the part is inclined at a large angle.

<STEPS 108~110>

After the part to be picked up is determined, coordinate data of the part is sent to the robot controller (step 108). The robot controller controls the robot such that the robot arm picks up the selected part (#2 in the above example) from the bin and carries the part to a required position (step 109). Next, whether picking up all of the parts is complete or not is checked (step 110). In case of YES, the operation is finished. In case of NO, the above-described operation is repeated.

It is preferred to adopt the method comprising the steps of predicting a two-dimensional feature of the object on the left and right images according to the position and posture in three dimensions of the object recognized in the step 105, and evaluating a similarity between the predicted two-dimensional feature and the two-dimensional feature of the object detected in the steps (101A, 101B). Concretely, two-dimensional features on the left and right images are predicted according to the information in three dimensions of the object obtained in the step 105 and projection models of the cameras. The predicted two-dimensional features are compared with the two-dimensional features detected in the step (101A, 101B) to evaluate the results of two-dimensional features detected in the step (101A, 101B). Thus, the two-dimensional features can be more accurately evaluated by feeding the obtained information in three dimensions back to the evaluation treatment for the two-dimensional features. Therefore, it is possible to improve the recognition accuracy of the position and posture in three dimensions of the object.

As described above, according to the present invention, since a degree of reliability of the measurement result is suitably evaluated at an early stage of the method of recognizing position and posture in three dimensions of an object from a pair of images for making a stereoscopic view of the object, information with uncertainty can be deleted early, and the subsequent treatments can be performed by use of the information with a high degree of reliability. Therefore, even when facing a complex situation that a plurality of parts having the same shape are heaped up in confusion, it is possible to accurately recognize the position and posture in three dimensions of the object at high speed.

Second Embodiment

Figure 14:
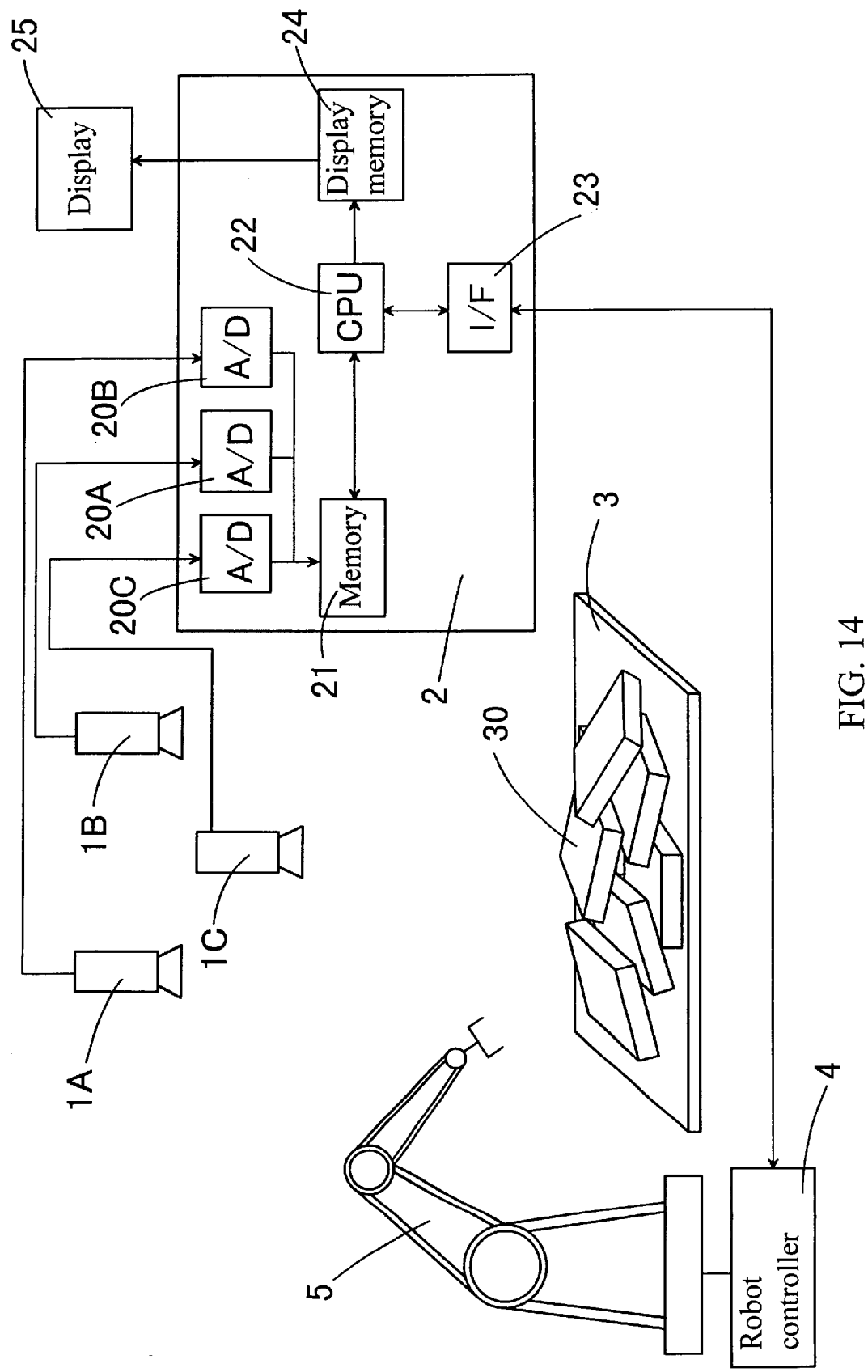
FIG. 14 is a schematic diagram of a bin-picking system using a three-dimensional object recognition method according to a second embodiment of the present invention.
Figure 15:
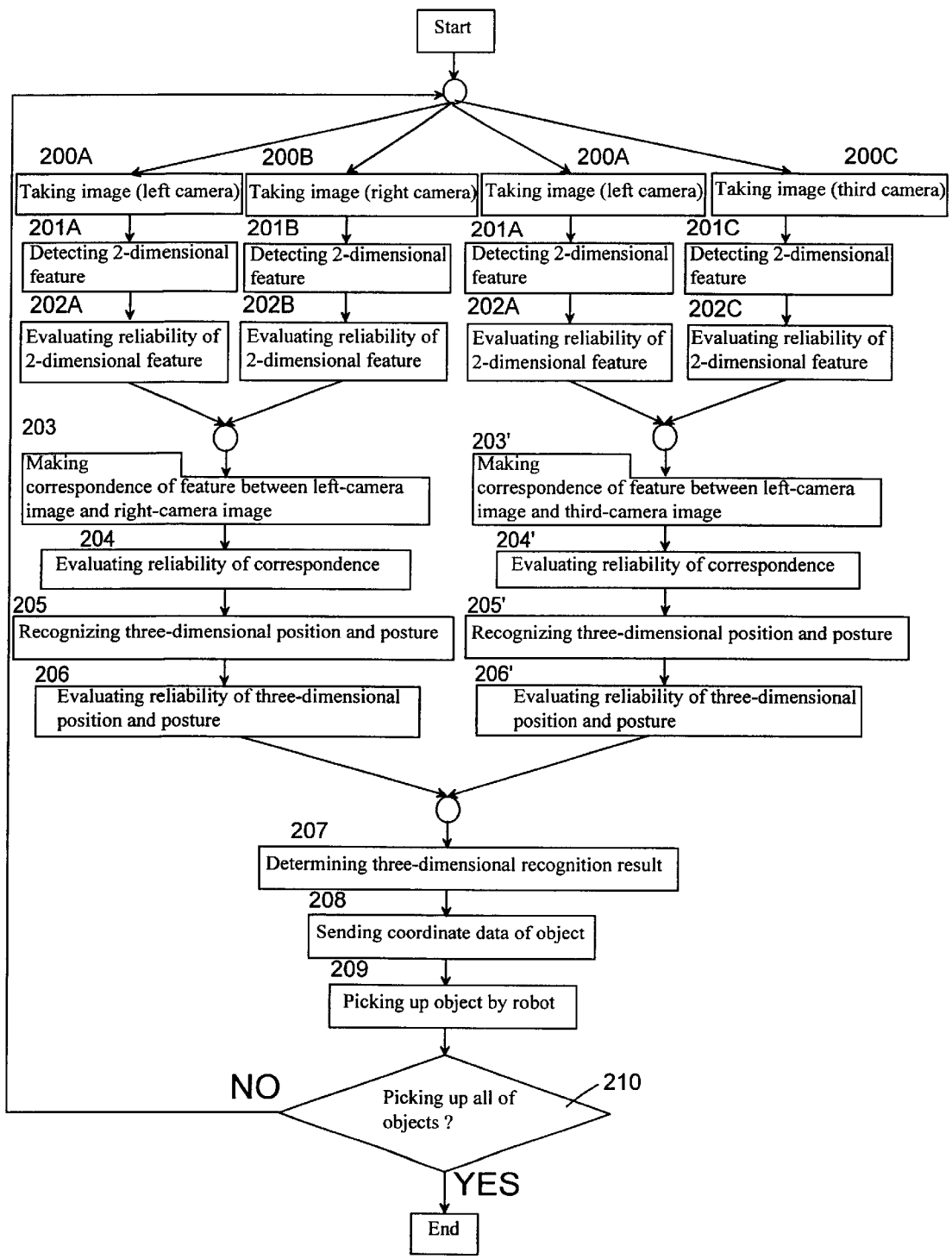
FIG. 15 is a flowchart showing the three-dimensional object recognition method according to the second embodiment of the present invention.

As shown in FIG. 14, a bin-picking system of the second embodiment is substantially equal to the bin-picking system of the first embodiment except that a third camera 1C is used in addition to the TV cameras (1A, 1B), and a three-dimensional object recognition method shown in FIG. 15 can be performed by use of an image-processing unit with an A/D converter 20C for the third camera 1C.

The three-dimensional object recognition method of the present embodiment comprises a step 200A of taking a left image, step 201A of detecting a two-dimensional feature of the object on the left image, step 202A of evaluating a degree of reliability of the two-dimensional feature, step 200B of taking a right image, step 201B of detecting the two-dimensional feature of the object on the right image, and a step 202B of evaluating a degree of reliability of the two-dimensional feature. These steps are performed according to the same manner as the first embodiment. The method of present embodiment further comprises a step 200C of taking a third image, step 201C of detecting the two-dimensional feature of the object on the third image, and a step 202C of evaluating a degree of reliability of the two-dimensional feature. These steps are performed according to the same manner as the cases of the left and right images.

Next, a step (203) of making a correspondence of the two-dimensional feature between the left and right images, step (204) of evaluating a degree of reliability of the correspondence, step (205) of recognizing position and posture in three dimensions of the object, and a step (206) of evaluating a degree of reliability of the recognition results of the position and posture in three dimensions are performed according to the same manner as the first embodiment. On the other hand, a step (203') of making a correspondence of the two-dimensional feature between the left and third images, step (204') of evaluating a degree of reliability of the correspondence, step (205') of recognizing position and posture in three dimensions of the object, and a step (206') of evaluating a degree of reliability of the recognition results of the position and posture in three dimensions are independently performed according to the same manner as the above. The information of the position and posture in three dimensions provided from the step 206 and the information of the position and posture in three dimensions provided from the step 206' are combined at a step 207. The subsequent steps are basically equal to the first embodiment, therefore the explanations thereof are omitted.

In the system of this embodiment, a structure of the whole system slightly increases in complexity. However, there is an advantage that the position and posture in three dimensions of the object can be recognized with uniform measurement accuracy regardless of the posture of the object. If necessary, the three-dimensional object recognition method can further comprise the steps of adding a camera(s) for taking an image from a different viewpoint from the left, right and third images, and performing the recognition treatment with use of the image information provided from the additional camera. When using a lot of cameras, speeding up the recognition treatment is an important subject to provide the practical system. Therefore, it is preferred to use architecture of parallel distributed processing.

The degree of reliability may be evaluated between the steps 204 and 205 and between the steps 204' and 205' according to a color of the object. Concretely, a shift of a measured color of a rectangular surface of the object from the actual color of the corresponding rectangular surface of the object is calculated, and the obtained shift is used to evaluate the degree of reliability. For example, a scalar product of normalized color vectors is determined. When the normalized color vector of the measured rectangular surface of the object is represented by C(R, G, B), and the normalized color vector of the actual rectangular surface of the object is represented by Cm(Rm, Gm, Bm), a reliability evaluation value "fc" can be determined by the following equation, $$fc = Cm \cdot C = Rm*R + Gm*G + Bm*B \qquad (15)$$

In addition, the degree of reliability may be evaluated according to a pattern on the object in place of the above-mentioned color. Concretely, an amount of deviation of a measured pattern of a rectangular surface of the object from the actual pattern of the corresponding rectangular surface of the object is calculated, and the obtained deviation amount is used to evaluate the degree of reliability. For example, it is preferred to use a variance of surface brightness. When the brightness of the measured rectangular surface of the object and the brightness of the actual rectangular surface of the object are respectively represented by "I" and "Im", and "Var ( )" shows the variance, a reliability evaluation value "fp" can be determined by the following equation.

$$fp = 1/(1 + |+\text{Var}(Im) - \text{Var}(I)|) \qquad (16)$$

Thus, the recognition accuracy can be further improved by additionally performing the reliability evaluation according to the color or the pattern.

Third Embodiment

The second embodiment described above explains that the recognition accuracy of position and posture in three dimensions of the object can be improved by making the correspondence of the two-dimensional feature between the left image and the right image and between the left image and the third image. In this embodiment, the three-dimensional object recognition method is performed in consideration of making the correspondence of the two-dimensional feature between the right image and the third image.

Figure 16:
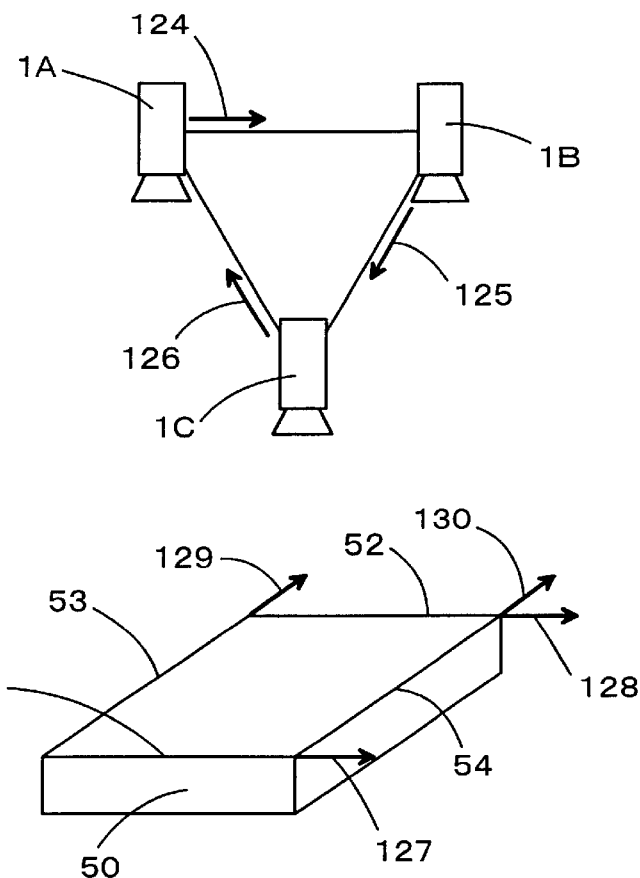
FIG. 16 is an explanatory diagram for a three-dimensional object recognition method according to a third embodiment of the present invention.

Concretely, as shown in FIG. 16, explanations are given about a case that a rectangular solid 50 is used as an object to be recognized, and two parallel straight-line pairs (51, 52), (53, 54) are used as two-dimensional features of the object. First, images of the rectangular solid are taken by use of three cameras 1A, 1B, and 1C. Next, the two parallel straight-line pairs (51, 52), (53, 54) are extracted as the two-dimensional features from each of the three images. A first treatment of making a correspondence between the left image taken by the camera 1A and the right image taken by the camera 1B, second treatment of making the correspondence between the left image and the third image taken by the camera 1C, and a third treatment of making the correspondence between the right image and the third image are performed. Each of the treatments can be performed according to the same manner as the step 103 of the first embodiment. Then, the result with the highest degree of reliability is determined from the results of the first to third treatments by a reliability evaluation method described below.

Four directions of the two parallel straight-line pairs are designated as 127, 128, 129 and 130. In addition, a direction of a straight line connecting optical centers of the TV cameras 1A and 1B, direction of a straight line connecting optical centers of the TV cameras 1B and 1C, and a direction of a straight line connecting optical centers of the TV cameras 1C and 1A are designated as 124, 125, and 126, respectively. First, with respect to the directions 127, 128 of the parallel straight-line pair 51, 52, an angle (γ) defined by the straight line connecting the optical centers of the two TV cameras and these directions is calculated. A degree of reliability "f(γ)" can be determined according to functions of this angle (in the present explanation, sine functions of trigonometric functions shown below).

$$\gamma < 90: \quad f(\gamma) = \sin(\gamma) \qquad (17)$$

$$\gamma \geq 90: \quad f(\gamma) = \sin(180 - \gamma) \qquad (18)$$

As a result of calculating the angle, the angle defined by the direction 127, 128 and the direction 124 is 10 degrees, the angle defined by the direction 127, 128 and the direction 125 is 50 degrees, and the angle defined by the direction 127, 128 and the direction 126 is 70 degrees. From these results, since the correspondence between the TV cameras IC and 1A presents the highest degree of reliability with regard to the line segments 51 and 52, the result of the correspondence of the second treatment is selected. On the other hand, the angle defined by the direction 129, 130 of the line segments 53, 54 and the direction 124 is 80 degrees, the angle defined by the direction 129, 130 and the direction 125 is 40 degrees, and the angle defined by the direction 129, 130 and the direction 126 is 20 degrees. From these results, since the correspondence between the TV cameras 1A and 1B presents the highest degree of reliability with regard to the line segments 53 and 54, the result of the correspondence of the-first treatment is selected.

Thus, the three-dimensional object recognition method are performed by selectively using the result of the treatment of making the correspondence with the highest degree of reliability with respect to each of the local features. Therefore, it is possible to provide the recognition results with improved accuracy. Since steps of recognizing the position and posture in three dimensions of the object according to the results of the treatment of making the correspondence, and evaluating the degree of reliability of the recognition results can be performed according to the same manner as the above embodiments, the explanations are omitted.

Fourth Embodiment

In case of performing a three-dimensional object recognition method with use of a system having three cameras, as shown in FIG. 14, the present embodiment is characterized by the steps of projecting a three-dimensional feature obtained by making the correspondence between left and right images on a third image taken by a third camera having a known positional relation in three dimensions with first and second cameras, calculating an amount of deviation of the projected two-dimensional feature from the corresponding two-dimensional feature of the third image, and evaluating a degree of reliability of the two-dimensional feature according to the amount of deviation.

Figure 17:
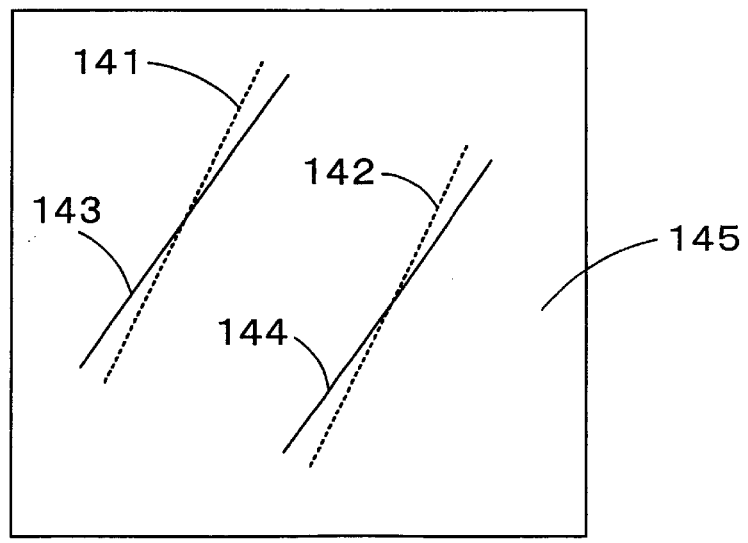
FIG. 17 is an explanatory diagram for a three-dimensional object recognition method according to a fourth embodiment of the present invention.

Concretely, the correspondence of a pair of straight lines between the left image and the right image is made first. This result is projected on the third image. In FIG. 17, the numerals 141 and 142 designate projected images of the straight-line pair, and the numerals 143 and 144 designate images of the corresponding straight-line pair on the third image 145. An angle (δ) defined by the straight-line pair 143, 144 and the projected straight-line pair 141, 142 is calculated. A degree of reliability f(δ) can be determined according to a function of this angle (in the present explanation, a cosine function of trigonometric function shown below).

$$f(\delta) = \cos(\delta) \tag{19}$$

As a value of f(δ) is smaller, the degree of reliability increases. When the measurement is correctly performed, the straight-line pair 143, 144 are in agreement with the projected straight-line pair 141, 142.

Thus, the position and posture in three dimensions of the object are recognized by evaluating the degree of reliability of the two-dimensional feature according to the projected image on the third image and selectively using the results of the correspondence with a high degree of reliability. Therefore, it is possible to provide the recognition results with improved accuracy. Since steps of recognizing the position and posture in three dimensions of the object according to the results of the treatment of making the correspondence, and evaluating the degree of reliability of the recognition results can be performed according to the same manner as the above embodiments, the explanations are omitted.

Fifth Embodiment

Figure 18:
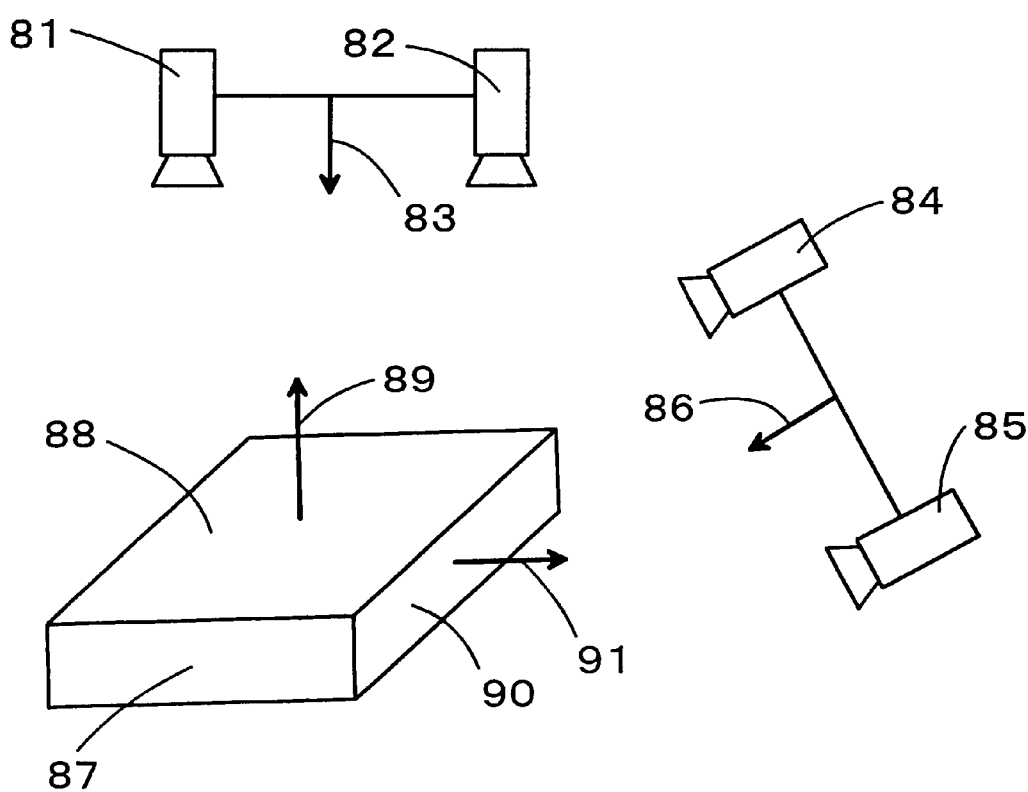
FIG. 18 is an explanatory diagram for a three-dimensional object recognition method according to a fifth embodiment of the present invention.

As shown in FIG. 18, a three-dimensional object recognition method of the present embodiment is characterized by using a first TV-camera pair 81, 82 for taking a pair of images for making a stereoscopic view of an object and a second TV-camera pair 84, 85 for taking a pair of images for making another stereoscopic view of the object from a different angle therefrom.

For example, two-dimensional features (straight lines intersecting at right angles) of planes 88 and 90 are extracted. Next, making the correspondence of the two-dimensional features detected by the TV cameras 81 and 82 and making the correspondence of the two-dimensional features detected by the TV cameras 84 and 85 are performed. Then, an angle (α) defined by a direction normal to the plane and a viewing direction of the TV camera is determined. Concretely, each of angles defined by the directions 89, 91 normal to the planes 88, 90 and the viewing directions 83, 86 of the first and second TV camera pairs is calculated. A reliability evaluation value f (α) can be determined by functions of this angle (in the present explanation, cosine functions of trigonometric functions shown below).

$$\alpha < 90: \quad f(\alpha) = \cos(\alpha) \tag{20}$$

$$\alpha \geq 90: \quad f(\alpha) = \cos(180 - \alpha) \tag{21}$$

With regard to the angle defined by the direction 89 normal to the plane 88 and each of the viewing directions 83, 86 of the first and second camera pairs, since the angle defined by the direction 89 and the viewing direction 83 is smaller than that defined by the direction 89 and the viewing direction 86, the reliability evaluation value f (α) of the former is high. Therefore, the result of measuring the plane 88 with the first TV-camera pair is selected. On the other hand, with regard to the angle defined by the direction 91 normal to the plane 90 and each of the viewing directions 83, 86 of the first and second camera pairs, since the angle defined by the direction 91 and the viewing direction 83 is larger than that defined by the direction 91 and the viewing direction 86, the reliability evaluation value f (α) of the latter is high. Therefore, the result of measuring the plane 90 with the second TV-camera pair is selected.

Thus, position and posture in three dimensions of the object are recognized by selectively using the measurement result with a higher degree of reliability with regard to each of planes constructing the object. Therefore, it is possible to provide the recognition results with improved accuracy. Since steps of recognizing the position and posture in three dimensions of the object according to the results of the treatment of making the correspondence, and evaluating the degree of reliability of the recognition results can be performed according to the same manner as the above embodiments, the explanations are omitted.

In the above-mentioned embodiments, the application of the three-dimensional recognition method of the present invention to the bin-picking system for supplying parts has been explained in detail. However, the method of the present invention is not limited to this application, and can be applied to various systems using information of position and/or posture in three dimensions of an object.

What is claimed is:

1. A 3-dimensional object recognition method comprising:
    a step (A) of taking a pair of first and second images for making a stereo image of an object;
    a step (B) of detecting a two-dimensional feature of said object in each of the first and second images;
    a step (D) of making a correspondence of said two-dimensional feature between the first and second images according to a stereoscopic measurement principle;
    a step (E) of evaluating a degree of reliability of a result of the step (D) by comparing said two-dimensional feature detected in the first image with a corresponding two-dimensional feature detected in the second image;
    a step (F) of recognizing three-dimensional position and posture of said object according to information in three dimensions of said two-dimensional feature obtained by the correspondence; and
    a step (G) of evaluating a degree of reliability of the recognized three-dimensional position and posture,
    wherein the step (E) includes comparing said two-dimensional feature detected in the first image with the corresponding two-dimensional feature detected in the second image, and deleting the detected two-dimensional feature as a wrong detection when a difference therebetween exceeds a required threshold value.

2. The 3-dimensional object recognition method as set forth in claim 1, wherein the step (B) includes extracting said two-dimensional feature of said object by firstly detecting a typical geometrical feature of said object and detecting a geometrical feature other than said typical feature as a supplemental feature.

3. The 3-dimensional object recognition method as set forth in claim 1, wherein said two-dimensional feature in the step (E) includes at least one of a straight line of said object, straight-line length, angle defined between a first parallel-line pair and a second parallel-line pair that form a rectangle of said object, and a distance between parallel lines of said object.

4. The 3-dimensional object recognition method as set forth in claim 1, wherein the step (F) includes determining a three-dimensional coordinate of a typical point of said object as the position of said object and a direction of normal to a typical plane of said object as the posture of said object according to the information in three dimensions of said two-dimensional feature.

5. The 3-dimensional object recognition method as set forth in claim 1, wherein the step (F) includes determining an average value of three-dimensional coordinates of typical points of said object as the position of said object and an average of directions of normal to typical planes of said object as the posture of said object according to the information in three dimensions of said two-dimensional feature.

6. The 3-dimensional object recognition method as set forth in claim 1, wherein the step (F) includes recognizing the three-dimensional posture of said object by detecting a pattern provided on said object.

7. The 3-dimensional object recognition method as set forth in claim 1, wherein the step (F) includes recognizing the three-dimensional posture of said object by detecting a color provided on said object.

8. The 3-dimensional object recognition method as set forth in claim 1, wherein the step (G) includes comparing the recognized three-dimensional position and posture of said object in the step (F) with a known three-dimensional feature of said object, and giving a rank in a degree of reliability to the recognized three-dimensional position and posture according to a difference therebetween.

9. The 3-dimensional object recognition method as set forth in claim 1, wherein the degree of reliability is evaluated by a reliability evaluation equation including at least two evaluation factors on geometrical features of said object, each of which has a weight according to its importance.

10. The 3-dimensional object recognition method as set forth in claim 1, further comprising:
   a step (H) of predicting a two-dimensional feature on each of the first and second images according to the three-dimensional position and posture obtained by the step (F); and
   a step (I) of evaluating a degree of agreement between the predicted two-dimensional feature and said two-dimensional feature detected in the step (B).

11. The 3-dimensional object recognition method as set forth in claim 1, wherein
   the step (A) includes providing a third image by taking said object from a viewpoint different from the first and second images,
   the step (B) includes detecting said two-dimensional feature of said object in the third image in addition to the first and second images, and
   the step (D) includes making the correspondence of said two-dimensional feature each between the first and second images, between the second and third images and between the first and third images according to the stereoscopic measurement principle,
   wherein the step (E) includes evaluating results of the step (D) in a degree of reliability, and providing the correspondence of said two-dimensional feature with a highest degree of reliability to the step (F).

12. A bin-picking system using the 3-dimensional object recognition method as set forth in claim 1, said system comprising:
   an image-processing unit for performing the 3-dimensional object recognition method;
   a robot with a flexible robot arm; and
   a robot controller for controlling said robot according to information provided from said image-processing unit such that said robot arm picks up an object from a bin, in which a plurality of objects are heaped up in confusion, and carries the picked-up object to a desired position.

13. The 3-dimensional object recognition method as set forth in claim 1, further comprising a step (C) of evaluating a degree of reliability of a result of the step (B) by comparing the result of step (B) with known model data of said object, which is performed between the steps (B) and (D).

14. The 3-dimensional object recognition method as set forth in claim 13, wherein the step (C) includes comparing said two-dimensional feature detected in each of the first and second images with a corresponding two-dimensional feature of the known model data, and deleting the detected two-dimensional feature as wrong detection when a difference therebetween exceeds a required threshold value.

15. The 3-dimensional object recognition method as set forth in claim 13, wherein said two-dimensional feature in the step (C) includes at least one of a straight line of said object, straight-line length, direction, angle defined between a first parallel-line pair and a second parallel-line pair that form a rectangle of said object, and a distance between parallel lines of said object.

16. A 3-dimensional object recognition method comprising:
   a step (A) of taking a pair of first and second images for making a stereo image of an object, and a third image from a viewpoint different from them;
   a step (B) of detecting a two-dimensional feature of said object in each of the first, second and third images;
   a step (D) of making a correspondence of the two-dimensional feature each between the first and second images and between the first and third images according to a stereoscopic measurement principle;
   a step (E) of evaluating a degree of reliability of a result of the step (D) by comparing the two-dimensional feature detected in the first image with the corresponding two-dimensional features detected in the second and third images;
   a step (F) of recognizing a first candidate of three-dimensional position and posture of said object according to information in three dimensions of the two-dimensional feature obtained from the correspondence between the first and second images, and a second candidate of three-dimensional position and posture of said object according to information in three dimensions of the two-dimensional feature obtained from the correspondence between the first and third images;
   a step (G) of evaluating a degree of reliability of each of the first and second candidates; and
   a step (H) of determining three-dimensional position and posture of said object according to the first and second candidates provided from the step (G).

17. A bin-picking system using the 3-dimensional object recognition method as set forth in claim 16, said system comprising:
   an image-processing unit for performing the 3-dimensional object recognition method;
   a robot with a flexible robot arm; and
   a robot controller for controlling said robot according to information provided from said image-processing unit such that said robot arm picks up an object from a bin, in which a plurality of objects are heaped up in confusion, and carries the picked-up object to a desired position.

18. The 3-dimensional object recognition method as set forth in claim 16, further comprising the step (C) of evaluating a degree of reliability of a result of the step (B) by comparing the result of step (B) with a model data of said object, which is performed between the steps (B) and (D).

19. A 3-dimensional object recognition method comprising:

a step (A) of taking a pair of first and second images for making a stereo image of an object;

a step (B) of detecting a two-dimensional feature of said object in each of the first and second images;

a step (D) of making a correspondence of said two-dimensional feature between the first and second images according to a stereoscopic measurement principle;

a step (F) of recognizing three-dimensional position and posture of said object according to information in three dimensions of said two-dimensional feature obtained by the correspondence; and a step (G) of evaluating a degree of reliability of the recognized three-dimensional position and posture, wherein the method comprises at least one of a step (C) of evaluating a degree of reliability of a result of the step (B) by comparing with known model data of said object, which is performed between the steps (B) and (D), and a step (E) of evaluating a degree of reliability of a result of the step (D) by comparing said two-dimensional feature detected in the first image with a corresponding two-dimensional feature detected in the second image, which is performed between the steps (D) and (F), and wherein the step (G) includes comparing the recognized three-dimensional position and posture of said object in the step (F) with a known three-dimensional feature of said object, and giving a rank in a degree of reliability to the recognized three-dimensional position and posture according to a difference therebetween.

20. A 3-dimensional object recognition method comprising:

a step (A) of taking a pair of first and second images for making a stereo image of an object;

a step (B) of detecting a two-dimensional feature of said object in each of the first and second images;

a step (D) of making a correspondence of said two-dimensional feature between the first and second images according to a stereoscopic measurement principle;

a step (F) of recognizing three-dimensional position and posture of said object according to information in three dimensions of said two-dimensional feature obtained by the correspondence;

a step (G) of evaluating a degree of reliability of the recognized three-dimensional position and posture;

a step (H) of predicting a two-dimensional feature on each of the first and second images according to the three-dimensional position and posture obtained by the step (F); and a step (I) of evaluating a degree of agreement between the predicted two-dimensional feature and said two-dimensional feature detected in the step (B), wherein the method comprises at least one of a step (C) of evaluating a degree of reliability of a result of the step (B) by comparing with known model data of said object, which is performed between the steps (B) and (D), and a step (E) of evaluating a degree of reliability of a result of the step (D) by comparing said two-dimensional feature detected in the first image with a corresponding two-dimensional feature detected in the second image, which is performed between the steps (D) and (F).

21. A bin-picking system comprising:

an image-processing unit for performing a 3-dimensional object recognition method comprising:

a step (A) of taking a pair of first and second images for making a stereo image of an object;

a step (B) of detecting a two-dimensional feature of said object in each of the first and second images;

a step (D) of making a correspondence of said two-dimensional feature between the first and second images according to a stereoscopic measurement principle;

a step (F) of recognizing three-dimensional position and posture of said object according to information in three dimensions of said two-dimensional feature obtained by the correspondence; and a step (G) of evaluating a degree of reliability of the recognized three-dimensional position and posture, wherein the method comprises at least one of a step (C) of evaluating a degree of reliability of a result of the step (B) by comparing with known model data of said object, which is performed between the steps (B) and (D), and a step (E) of evaluating a degree of reliability of a result of the step (D) by comparing said two-dimensional feature detected in the first image with a corresponding two-dimensional feature detected in the second image, which is performed between the steps (D) and (F); a robot with a flexible robot arm; and a robot controller for controlling said robot according to information provided from said image-processing unit such that said robot arm picks up an object from a bin, in which a plurality of objects are heaped up in confusion, and carries the picked-up object to a desired position.

22. A bin-picking system comprising:

an image-processing unit for performing a 3-dimensional object recognition method comprising:

a step (A) of taking a pair of first and second images for making a stereo image of an object, and a third image from a viewpoint different from them;

a step (B) of detecting a two-dimensional feature of said object in each of the first, second and third images;

a step (D) of making a correspondence of the two-dimensional feature each between the first and second images and between the first and third images according to a stereoscopic measurement principle;

a step (F) of recognizing a first candidate of three-dimensional position and posture of said object according to information in three dimensions of the two-dimensional feature obtained from the correspondence between the first and second images, and a second candidate of three-dimensional position and posture of said object according to information in three dimensions of the two-dimensional feature obtained from the correspondence between the first and third images;

a step (G) of evaluating a degree of reliability of each of the first and second candidates;

wherein the recognition method comprises at least one of a step (C) of evaluating a degree of reliability of a result of the step (B) by comparing with a model data of said object, which is performed between the steps (B) and (D), and a step (E) of evaluating a degree of reliability of a result of the step (D) by comparing the two-dimensional feature detected in the first image with the corresponding two-dimensional features detected in the second and third images, which is performed between the steps (D) and (F), and a step (H) of determining three-dimensional position and posture of said object according to the first and second candidates provided from the step (G); a robot with a flexible robot arm; and a robot controller for controlling said robot according to information provided from said image-processing unit such that said robot arm picks up an object from a bin, in which a plurality of objects are heaped up in confusion, and carries the picked-up object to a desired position.

* * * * *